(12) United States Patent
Huang

(10) Patent No.: US 10,750,181 B2
(45) Date of Patent: Aug. 18, 2020

(54) METHOD AND APPARATUS OF ADAPTIVE MULTIPLE TRANSFORMS FOR VIDEO CODING

(71) Applicant: MEDIATEK INC., Hsin-Chu (TW)

(72) Inventor: Han Huang, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/964,310

(22) Filed: Apr. 27, 2018

(65) Prior Publication Data
US 2018/0332289 A1 Nov. 15, 2018

Related U.S. Application Data

(60) Provisional application No. 62/615,555, filed on Jan. 10, 2018, provisional application No. 62/525,240, filed on Jun. 27, 2017, provisional application No. 62/504,646, filed on May 11, 2017.

(51) Int. Cl.
| | |
|---|---|
| *H04N 19/13* | (2014.01) |
| *H04N 19/625* | (2014.01) |
| *H04N 19/96* | (2014.01) |
| *H04N 19/174* | (2014.01) |
| *H04N 19/186* | (2014.01) |
| *H04N 19/12* | (2014.01) |
| *H04N 19/176* | (2014.01) |
| *H04N 19/139* | (2014.01) |

(52) U.S. Cl.
CPC .............. *H04N 19/13* (2014.11); *H04N 19/12* (2014.11); *H04N 19/139* (2014.11); *H04N 19/174* (2014.11); *H04N 19/176* (2014.11); *H04N 19/186* (2014.11); *H04N 19/625* (2014.11); *H04N 19/96* (2014.11)

(58) Field of Classification Search
None
See application file for complete search history.

(56) References Cited

U.S. PATENT DOCUMENTS

| | | | |
|---|---|---|---|
| 2013/0003828 A1 | 1/2013 | Cohen et al. | |
| 2014/0153844 A1* | 6/2014 | Jeon | H04N 19/82 382/300 |
| 2016/0219290 A1 | 7/2016 | Zhao et al. | |
| 2016/0337662 A1* | 11/2016 | Pang | H04N 19/176 |
| 2018/0091816 A1* | 3/2018 | Chien | H04N 19/13 |

(Continued)

*Primary Examiner* — Frederick D Bailey
(74) *Attorney, Agent, or Firm* — McClure, Qualey & Rodack, LLP

(57) ABSTRACT

A method and apparatus for video encoding or decoding performed by a video encoder or a video decoder incorporating advanced multiple transform (AMT) are disclosed. According to this method, a transform set consisting of two type candidates designated as a first type and a second type is determined, where the first type and the second type are different. If AMT is used by the current block, a vertical transform is selected from the transform set and a horizontal transform is selected from the transform set. A transform index, for indicating both vertical transform selection and horizontal transform selection, can be signaled at the encoder side or the transform index is parsed at the decoder side. Another method and apparatus incorporating AMT are also disclosed where the transform set is determined according to the resolution of current MVD.

8 Claims, 3 Drawing Sheets

(56) References Cited

U.S. PATENT DOCUMENTS

| | | | |
|---|---|---|---|
| 2018/0262777 A1* | 9/2018 | Filippov | H04N 19/122 |
| 2019/0028703 A1* | 1/2019 | Tamse | H04N 19/176 |
| 2019/0191163 A1* | 6/2019 | Lee | H04N 19/119 |
| 2019/0200040 A1* | 6/2019 | Lim | H04N 19/176 |
| 2019/0364298 A1* | 11/2019 | Kang | H04N 19/139 |

* cited by examiner

METHOD AND APPARATUS OF ADAPTIVE MULTIPLE TRANSFORMS FOR VIDEO CODING

CROSS REFERENCE TO RELATED APPLICATIONS

The present invention claims priority to U.S. Provisional Patent Application Ser. No. 62/504,646, filed on May 11, 2017, U.S. Provisional Patent Application Ser. No. 62/525,240, filed on Jun. 27, 2017, and U.S. Provisional Patent Application Ser. No. 62/615,555, filed on Jan. 10, 2018. The U.S. Provisional Patent Applications are hereby incorporated by reference in their entireties.

FIELD OF THE INVENTION

The invention relates generally to video coding. In particular, the present invention relates to techniques to improve coding efficiency or reduce complexity for video coding systems using Enhanced Multiple Transform (EMT), also referred as Adaptive Multiple Transform (AMT).

BACKGROUND AND RELATED ART

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC).

In HEVC, one slice is partitioned into multiple coding tree units (CTU). In main profile, the minimum and the maximum sizes of CTU are specified by the syntax elements in the Sequence Parameter Set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU or can be split into four smaller units of equal sizes (i.e., M/2×M/2), which are nodes of coding tree. If units are leaf nodes of coding tree, the units become CUs. Otherwise, the quadtree splitting process can be iterated until the size for a node reaches a minimum allowed CU size as specified in the SPS. This representation results in a recursive structure as specified by a coding tree (also referred to as a partition tree structure).

One or more prediction units (PU) are specified for each CU. Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type.

After obtaining the residual block by applying the prediction process based on the PU splitting type, a CU can be partitioned into transform units (TUs) according to another quadtree structure, which is analogous to the coding tree for the CU. The TU is a basic representative block of residual or transform coefficients for applying the integer transform and quantization. For each TU, one integer transform with the same size is applied to the TU to obtain residual coefficients. These coefficients are transmitted to the decoder after quantization on a TU basis.

The terms, coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

In the next generation video coding, a method to combine the quadtree and binary tree structure has been adopted in JVET-E1001 (Chen et al., "Algorithm Description of Joint Exploration Test Model 5 (JEM 5)", Joint Collaborative Team on Video Coding of ITU-T SG16 WP3 and ISO/IEC JTC1/SC29/WG11, 5th Meeting: Geneva, CH, 12-20 January, 2017, Document: JVET-E1001), which is called quadtree plus binary tree (QTBT) structure.

The disclosed tree structure can be applied separately to luma and chroma for the I-slice (i.e., Intra coded slice) and applied simultaneously to both luma and chroma (except when certain minimum sizes are reached for chroma) for the P- and B-slice. In other words, in the I-slice, the luma CTB has its QTBT-structured block partitioning, and the two chroma CTBs have another QTBT-structured block partitioning. The two chroma CTBs may also have their own QTBT-structured block partitioning.

In HEVC, for each TU, one integer transform having the same size to the TU is applied to obtain residual coefficients. These coefficients are transmitted to the decoder after quantization on a TU basis. HEVC adopts Discrete Cosine Transform Type II (DCT-II) as its core transform because it has a strong "energy compaction" property. Most of the signal information tends to be concentrated in a few low-frequency components of the DCT-II, which approximates the Karhunen-Loève Transform (KLT). As is known in the field of data compression, KLT is optimal in the decorrelation sense for signals based on certain limits of Markov processes. The N-point DCT-II of the signal f[n] is defined as (1).

$$\hat{f}_{DCT-II}[k] = \lambda_k \frac{2}{\sqrt{N}} \sum_{n=0}^{N-1} f[n]\cos\left[\frac{k\pi}{N}\left(n + \frac{1}{2}\right)\right], \quad (1)$$

$$k = 0, 1, 2, \ldots, N-1, \lambda_k = \begin{cases} 2^{-0.5}, & k = 0 \\ 1, & k \neq 0 \end{cases}$$

In the Joint Exploration Test Model 5 (JEM 5), large block-size transforms, up to 128×128 in size, are enabled to improve coding efficiency especially for higher resolution video (e.g., 1080p and 4K sequences). In addition to DCT-II and 4×4 DST-VII (Discrete Sine Transform Type VII), which have been employed in HEVC, an Adaptive Multiple Transform (AMT) scheme is used for residual coding for both Inter and Intra coded blocks. For Intra-predicted residue, other transforms may be more efficient than DCT-II. Accordingly, in JVET-E1001 (i.e., JEM 5), an Enhanced Multiple Transform (EMT) scheme is used for residual coding for both Intra and Inter-coded blocks. In the literature, the EMT may also be referred as Adaptive Multiple Transform (AMT). In this disclosure, the terms AMT and EMT are used interchangeably. It utilizes multiple selected transforms from the DCT/DST families other than the current transforms in HEVC. The newly introduced transform matrices are DST-VII, DCT-VIII, DST-I and DCT-V. Table 1 summarizes the transform basis functions of each transform for N-point input.

TABLE 1

Transform basis functions for N-point input

| Transform Type | Basis function $T_i(f)$, i, j=0, 1, ..., N-1 |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ where $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$, where $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

According to EMT, multiple transforms can be selected for one TU. For example, for Inter CUs, one EMT flag can be coded to indicate that the HEVC transform is used (i.e., EMT flag equal to zero) or one of the new multiple transforms is used (i.e., EMT flag equal to one). When EMT flag is equal to one, there are two kinds of different transforms in horizontal and vertical directions, respectively. An EMT index may be used to indicate the transform selected for each of the horizontal and vertical directions. Overall, four different transforms are supported for each CU when EMT flag is one. For Intra CUs, there are also four candidates in multiple transforms. However, these four candidates are variants according to Intra prediction direction.

In order to keep the orthogonality of the transform matrix, the transform matrices are quantized more accurately than the transform matrices in HEVC. To keep the intermediate values of the transformed coefficients within the range of 16-bit, after horizontal and after vertical transform, all the coefficients are right shifted by 2 more bits, comparing to the right shift used in the current HEVC transforms.

The AMT is enabled for CUs with both width and height smaller than or equal to 64. Whether AMT is applied or not is controlled by a CU-level flag. When the CU-level flag is equal to 0, DCT-II is applied in the CU to code the residue. For luma coding blocks within an AMT enabled CU, two additional flags are signaled to identify the horizontal and vertical transform to be used.

When AMT is available, a CU level flag is used to control whether AMT is applied to the CU. When the CU level AMT flag is equal to 0, DCT-II is applied to the CU to code the residue in both horizontal and vertical directions. For a luma coding block, when the CU AMT flag is equal to 1 indicating AMT is applied to the CU, two additional flags are signaled to identify the selected horizontal and vertical transforms.

For Intra residue coding, due to the different residual statistics of different Intra prediction modes, a mode-dependent transform candidate selection process is used. Three transform sets have been pre-defined for each CU as shown in Table 2, where each set consists of two different transforms. A transform index from 0 to 2 is used to select a transform set. The transform set is selected based on the Intra prediction mode of the CU, as specified in Table 3. Based on Table 3, a transform set is first identified according to the Intra prediction mode of a CU when the CU-level AMT flag is equal to 1. Upon the identified transform set, for each of the horizontal and vertical transforms, one of the two transform candidates is selected based on an explicitly signaled flag. For example, if Intra prediction mode 16 is used for a CU, the vertical transform will used transform set 0 (i.e., DST-VII and DCT-VIII) and the horizontal transform will used transform set 2 (i.e., DST-VII and DCT-V). Furthermore, a flag is signaled to indicate the transform candidate selected for the vertical transform and a flag is signaled to indicate the transform candidate selected for the horizontal transform. If the flags signaled correspond to (1, 0) for vertical and horizontal transforms respectively and the CU is coded using Intra prediction mode 16, the second candidate (i.e., DCT-VIII) from set 0 is used for the vertical transform and the first candidate (i.e., DST-VII) from set 2 is used for the horizontal transform

TABLE 2

Three pre-defined transform candidate sets

| Transform Set | Transform Candidates |
|---|---|
| 0 | DST-VII, DCT-VIII |
| 1 | DST-VII, DST-I |
| 2 | DST-VII, DCT-V |

TABLE 3

Transform set selection based on Intra prediction mode

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| V | 0 | 0 | 0 | 0 | 0 | 1 | 0 | 1 | 0 | 1 | 0 | 1 | 0 | 1 | 0 | 1 | 0 |
| H | 2 | 2 | 2 | 2 | 2 | 1 | 0 | 1 | 0 | 1 | 0 | 1 | 0 | 1 | 0 | 1 | 0 |

TABLE 3-continued

Transform set selection based on Intra prediction mode

| Intra Mode | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

| Intra Mode | 53 | 54 | 55 | 56 | 57 | 58 | 59 | 60 | 61 | 62 | 63 | 64 | 65 | 66 |
|---|---|---|---|---|---|---|---|---|---|---|---|---|---|---|
| V | 2 | 2 | 1 | 0 | 1 | 0 | 1 | 0 | 1 | 0 | 1 | 0 | 1 | 0 |
| H | 0 | 0 | 1 | 0 | 1 | 0 | 1 | 0 | 1 | 0 | 1 | 0 | 1 | 0 |

For Inter prediction residual, only one transform set consists of DST-VII and DCT-VIII is used for all Inter modes and for both horizontal and vertical transforms.

It is desirable to develop methods to further improve the coding performance or reducing the complexity for system incorporating EMT.

BRIEF SUMMARY OF THE INVENTION

A method and apparatus for video encoding or decoding performed by a video encoder or a video decoder incorporating advanced multiple transform (AMT) are disclosed. According to this method, input data associated with a current block in a current picture are received, wherein the input data corresponds to the current block to be processed by a forward transform process at an encoder side and the input data corresponds to a current coefficient block to be processed by an inverse transform process at a decoder side. A transform set consisting of two type candidates designated as a first type and a second type or consisting of three types corresponding to the first type, the second type and a flipped second type is determined, where the first type and the second type are different. If AMT (adaptive multiple transform) is used by the current block, a vertical transform is selected from the transform set and a horizontal transform is selected from the transform set. A current coefficient block is generated according to the current block, the vertical transform and the horizontal transform at the encoder side or the current block is recovered according to the current coefficient block, the vertical inverse transform associated with the vertical transform and the horizontal inverse transform associated with the horizontal transform at the decoder side.

In one embodiment, a transform index, for indicating both vertical transform selection and horizontal transform selection, is signaled at the encoder side or the transform index is parsed at the decoder side. The transform index can be binarized into a binary string, and one or more bins of the binary string can be coded using CABAC (Context-Adaptive Binary Arithmetic Coding). In another embodiment, the CABAC for said one or more bins of the binary string uses N contexts, where N corresponds to a positive integer. A context index for the CABAC can be determined according to the block size of the current block. In yet another embodiment, a first context set is used for the CABAC for the current block being coded with an Intra prediction mode and a second context set is used for the CABAC for the current block being coded with an Inter prediction mode.

In one embodiment, when the transform set consists of the first type and the second type, a first flag for indicating the vertical transform selection and a second flag for indicated horizontal transform selection are signaled at the encoder side or parsed at the decoder side. The first flag and the second flag can be coded using CABAC (Context-Adaptive Binary Arithmetic Coding). A first context set used by the first flag can be different from a second context set used by the second flag. In another embodiment, a context for the first flag and the second flag can be determined based on respective vertical transform selection and horizontal transform selection of one or more spatial neighboring blocks. When the current coefficient block is signaled before the first flag and the second flag at the encoder side or parsed after the current coefficient block at the decoder side, and if a number of non-zero coefficients of the current coefficient block is less than a threshold, the first flag and the second flag are not signaled at the encoder side or parsed at the decode side. In this case, the first flag and the second flag are inferred to be a pre-defined type.

In one embodiment, the first type corresponds to DCT-II (Discrete Cosine Transform Type II) and the second type is selected from a group comprising DST-IV (Discrete Sine Transform Type IV), DST-VII (Discrete Sine Transform Type VII) and flipped DCT-IV (FDCT-IV, Flipped Discrete Cosine Transform Type IV). If AMT is not used by the current block, the first type can be selected for both the vertical transform and the horizontal transform. If AMT is used by the current block, the vertical transform and the horizontal transform select different transform types or both the vertical transform and the horizontal transform select the second type. If AMT is used by the current block, whether the second type is allowed for the current block may depend on a size related to the current block. The size related to the current block may correspond to the transform block size. The size related to the current block may correspond to transform width or transform height.

Another method and apparatus for video encoding or decoding performed by a video encoder or a video decoder incorporating advanced multiple transform (AMT) are disclosed. According to this method, input data associated with a current block in a current picture are received, wherein the input data corresponds to the current block to be processed by a forward transform process at an encoder side and the input data corresponds to a current coefficient block to be processed by an inverse transform process at a decoder side. The resolution of the current MVD (motion vector differences) associated the current block is determined. A transform set also determined according to the resolution of current MVD. A vertical transform and a horizontal transform are selected from the transform set. A current coefficient block is generated according to the current block, the vertical transform and the horizontal transform at the encoder side or the current block is recovered according to the current coefficient block, the vertical inverse transform associated with the vertical transform and the horizontal inverse transform associated with the horizontal transform at the decoder side.

In one embodiment, if the resolution of current MVD corresponds to integer luma sample or four luma sample, a reduced transform set is used for said selecting the vertical transform and the horizontal transform, or a default transform type is selected for both the vertical transform the horizontal transform. For example, the default transform type may correspond to DCT-II (Discrete Cosine Transform Type II) or the default transform type can be signaled in SPS (sequence parameter set), PPS (picture parameter set) or slice header.

In another embodiment, the transform set is determined based on the resolution of current MVD and a size related to the current block. For example, if the resolution of current MVD corresponds to integer luma sample or four luma sample and the size related to the current block is larger than a threshold, a reduced transform set is used for said selecting the vertical transform and the horizontal transform, or a default transform type is selected for both the vertical transform the horizontal transform. The default transform type may correspond to DCT-II (Discrete Cosine Transform Type II) or the default transform type can be signaled in SPS (sequence parameter set), PPS (picture parameter set) or slice header. The size related to the current block may correspond to block size of the current block, length of a longer side of the current block, or length of a shorter side of the current block.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

MVD-Resolution Dependent AMT

Figure 1:
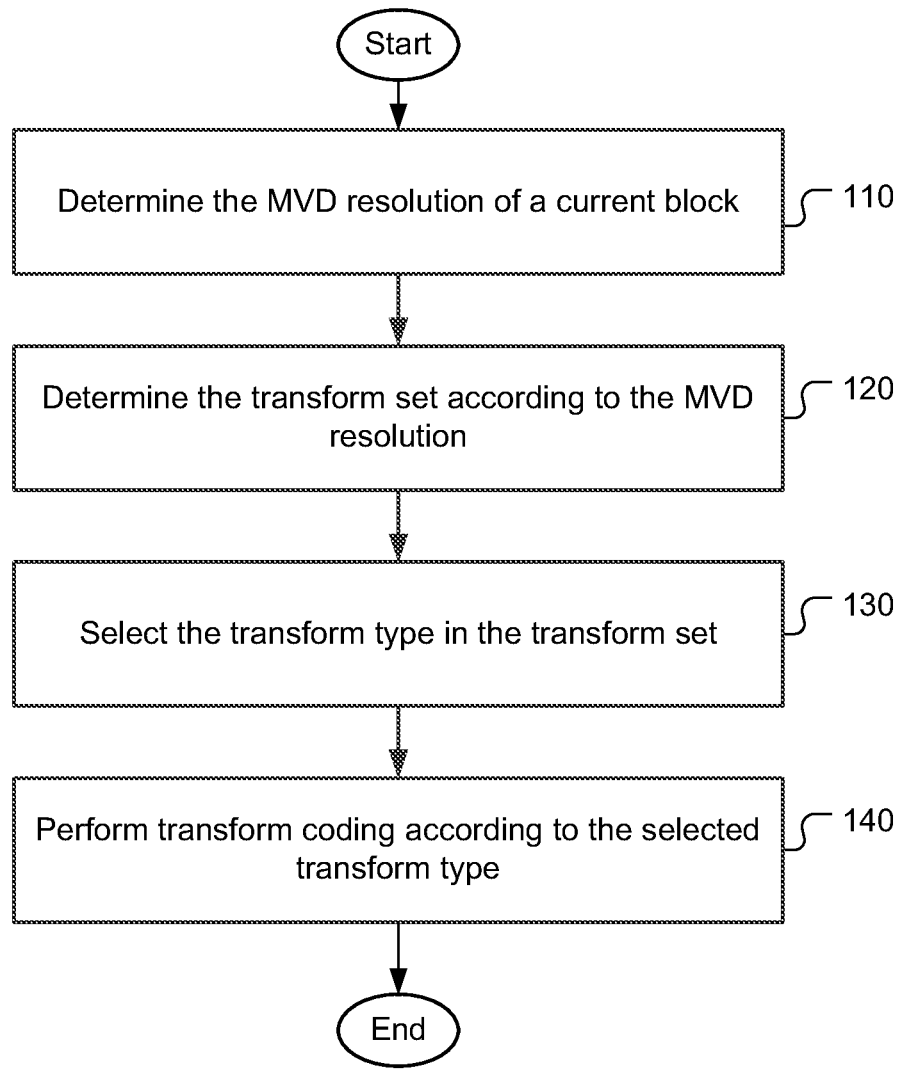
FIG. 1 illustrates an exemplary AMT (Advanced Multiple Transform) process according to a method of the present invention.

In the conventional AMT (Adaptive Multiple Transforms), the transform set is adaptively selected for each CU depending on the Intra prediction mode of the CU (Coding Unit). In order to improve the coding efficiency, the AMT is adaptively applied depending on the MVD (Motion Vector Difference) resolution. As is known in the field of video coding, the motion vector(s) associated with a current block can be efficiently signaled predictively by using a motion vector predictor. Accordingly, the MVD is signaled instead of motion vector itself. Furthermore, fractional-pel accuracy may be used for the motion vector, the motion vector predictor and MVD for more precise motion estimation/motion compensation. An exemplary process according to the present invention is illustrated in FIG. 1. The MVD resolution is first determined for a current block in step 110; then a transform set is determined according to the MVD resolution in step 120; a transform type in the transform set is selected for the vertical transform and horizontal transform respectively in step 130; and the transform types selected are used for the vertical transform and horizontal transform respectively in step 140. For example, at the encoder side, a current coefficient block is generated according to the current block, the vertical transform and the horizontal transform associated with the selected transform types. At the decoder side, the current block is recovered according to the current coefficient block, the vertical inverse transform associated with the vertical transform and the horizontal inverse transform associated with the horizontal.

In one embodiment, when integer luma samples or four luma sample MVD is used in a current block, adaptive multiple transform is disabled and a default transform type is used. Therefore, the CU level flag or flags to indicate the transform type of the horizontal and vertical transforms are not signaled for the current block. The default transform type can be predefined or signaled in the high level syntax. In one example, the default transform type in both directions is DCT-II. In another example, the default transform type is signaled in SPS (Sequence Parameter Set), PPS (Picture Parameter Set) or slice header. The four luma sample MVD refers to the case that the MVD resolution corresponds to four luma samples (i.e., 2×2 luma pixels).

In another embodiment, when integer luma samples or four luma sample MVD is used in a current block, a set of the full transform set is used for the current block. In one example, two transforms are chosen as the set. Firstly, one flag is signaled to indicate whether AMT is applied. If AMT is not applied, then a default transform type is used; and if AMT is applied, a second transform type is applied. The first transform type can be DCT-II or one of other predefined types and the second transform type can be DST-VII or one of other predefined types.

In still another embodiment, when four luma sample MVD is used in a current block, adaptive multiple transform is disabled and a default transform type in both direction is used. Therefore, the CU level flag and the flags to indicate transform type of the horizontal and vertical transforms are not signaled for the current block. The default transform type can be predefined or signaled in the high level syntax. In one example, the default transform type can be DCT-II. In another example, the default transform type can be signaled in SPS, PPS or slice header.

In still another embodiment, when four luma sample MVD is used in a current block, a subset of the full transform set is used for the current block. In one example, two transforms are chosen as the subset. Firstly, one flag is signaled to indicate whether AMT is applied. If AMT is not applied, then a default transform type is used; and if AMT is applied, a second transform type is applied. The first transform type can be DCT-II or one of other predefined types and the second transform type can be DST-VII or one of other predefined types.

In another method, the adaptive multiple transform is adaptively applied depending on the MVD resolution and the block size.

In one embodiment, when integer luma samples or four luma sample MVD is used in a current block and the block size of the current block is larger than a threshold, adaptive multiple transform is disabled and a default transform type is used. Therefore, the CU level flag and the flags to indicate transform type of the horizontal and vertical transforms are not signaled for the current block. The default transform type can be predefined or signaled in the high level syntax. In one example, the default transform type can be DCT-II. In another example, the default transform type can be signaled in SPS, PPS or slice header.

In another embodiment, when integer luma samples or four luma sample MVD is used in a current block and the block size of the current block is larger than a threshold, a subset of the full transform set is used for the current block. In one example, two transforms are chosen as the subset. Firstly, one flag is signaled to indicate whether AMT is applied. If AMT is not applied, then a first transform type is used; and if AMT is applied, a second transform type is applied. The first transform type can be DCT-II or one of other predefined types and the second transform type can be DST-VII or one of other predefined types.

In still another embodiment, when four luma sample MVD is used in a current block and the block size of the current block is larger than a threshold, adaptive multiple transform is disabled and a default transform type is used. Therefore, the CU level flag and the flags to indicate transform type in horizontal and vertical transforms are not signaled for the current block. The default transform type can be predefined or signal in the high level syntax. In one example, the default transform type can be DCT-II. In another example, the default transform type can be signaled in SPS, PPS or slice header.

In still another embodiment, when four luma sample MVD is used in a current block and the block size of the current block is larger than a threshold, a subset of transform set is used for the current block. In one example, two transforms are chosen as the subset. Firstly, one flag is signaled to indicate whether AMT is applied. If AMT is not applied, then a first transform type is used; and if AMT is applied, a second transform type is applied. The first transform type can be DCT-II or one of other predefined types and the second transform type can be DST-VII or one of other predefined types.

In all the above embodiments of this method, the block size can be measured by its area (i.e., width*height), the length of it longer side or the length of its shorter side.

In all the above embodiments of this method, the threshold for the block area can be predefined or signaled in the high level syntax. For examples, the threshold can be 64, 256, or 1024. In another example, the threshold can be signaled in SPS, PPS or slice header.

In all the above embodiments of this method, the threshold for block's longer side can be predefined or signaled in the high level syntax. Examples of threshold are: 8, 16, 32, et al. In another example, the threshold is signaled in SPS, PPS or slice header.

In all the above embodiments of this method, the threshold for block's shorter side can be predefined or signaled in the high level syntax. For examples, the threshold can be 8, 16, or 32. In another example, the threshold is signaled in SPS, PPS or slice header.

In yet another method, in all the methods and embodiments above in this invention, a constraint is used such that when AMT is applied, both directions (i.e., horizontal and vertical) should use the same transform type. Therefore, there is no need to indicate separately the transform type for each of the two directions.

Selection of Transform Type

Currently, there are up to eight types of Discrete Cosine Transforms (DCTs) and eight types of Discrete Sine Transforms (DSTs) that are involved with the conventional AMT. To support the large number of transforms for AMT, it causes high complexity to implement and requires more side information to indicate the selected type. In the present invention, it is proposed to use only two types of transforms for residual coding, denoted as Type A and Type B. For each of the horizontal and vertical transforms, either Type A or Type B is used. In one method, Type A always chooses DCT-II, and on the other hand, Type B may choose from one of the group comprising DST-IV, DST-VII and flipped DCT-IV (FDCT-IV). Some embodiments according to this method are listed as follows:

Type A is DCT-II and Type B is DST-IV
Type A is DCT-II and Type B is DST-VII.
Type A is DCT-II and Type B is FDCT-IV.

In the above embodiments, the choice of Type A and Type B can be swapped. For example, in the first embodiment above, Type A can be DST-IV and Type B can be DCT-II.

The N-point DST-IV transform of the signal f[n] is defined as $$\hat{f}_{DST-IV}[k] = \frac{2}{\sqrt{N}} \sum_{n=0}^{N-1} f[n] \sin\left[\frac{\pi}{N}\left(k + \frac{1}{2}\right)\left(n + \frac{1}{2}\right)\right],$$
$$k = 0, 1, \ldots, N-1.$$

The N-point DCT-IV transform of the signal f[n] is defined as $$\hat{f}_{DCT-IV}[k] = \frac{2}{\sqrt{N}} \sum_{n=0}^{N-1} f[n] \cos\left[\frac{\pi}{N}\left(k + \frac{1}{2}\right)\left(n + \frac{1}{2}\right)\right],$$
$$k = 0, 1, \ldots, N-1.$$

The FDCT-IV is defined as $\hat{f}_{FDCT-IV}[k] = \hat{f}_{DCT-IV}[N-1-k]$.

The selection of Type A and Type B can be signaled in the high level syntax, such as sequence parameter set (SPS), video parameter set (VPS), picture parameter set (PPS) or slice header.

Availability of Transform Types for Different Block Sizes

Another aspect of the present invention addresses the conditions to allow the Type A and Type B transforms. First, some parameters are defined: MaxTrSize being the allowed maximum transform size, and MinTrSize being the allowed minimum transform size.

In one embodiment, Type A and Type B transforms are available for all sizes in the range of MinTrSize and MaxTrSize.

In another embodiment, Type A is available for all sizes in the range between MinTrSize and MaxTrSize. However, Type B is only available for sizes in the range between MinTrSize and MaxTrSize/2. In the case of size equal to MaxTrSize, the transform is inferred to be Type A.

In still another embodiment, if the transform size in one direction is equal to a predefined minimum size, only a default transform type will be allowed. For example, when the transform size is equal to 4, default Type B is used.

In still another embodiment, if the width or height of a transform block is equal to MinTrSize, then the transform type for horizontal and vertical directions is forced to be the same. For example, if horizontal transform is determined to be Type A, then vertical transform is inferred to be Type A in this case.

Coding of the Transform Selection Flag

It is proposed that, for each of the horizontal and vertical directions, if Type A and Type B transform are both available, one flag (bin) is used to indicate the selection of transform type. The flag that controls the selection of Type A or Type B transform is coded by context adaptive binary arithmetic coder (CABAC).

In one embodiment, only one context is used to code the flags in both horizontal and vertical directions.

In another embodiment, two contexts are used, one for coding the flag in horizontal direction, the other for coding the flag in vertical direction.

In yet another embodiment, for each of the two directions, the flag is context coded using the transform types of spatial neighbor blocks. For example, the context index ctxIdx can be set to 2 if both the top and left blocks are coded in Type A; else the context index ctxIdx is set to 1 if one of the top and left blocks is coded in Type A; and else the context index ctxIdx is set 0.

In yet another embodiment, N (N>2) contexts are used. The context index is determined according to the size of the transform. For example, the context index ctxIdx is set to log 2(MaxTrSize)− log 2(CurrSize), where CurrSize corresponds to the size of the current transform. If ctxIdx is larger than (N−1), then ctxIdx is set to (N−1).

In still another embodiment, two sets of contexts consisting of N contexts in each set are used. The first set is used for coding the horizontal flag and the other set is used for coding the vertical flag. The index in each set is determined according to the size of transform or the transform types of spatial neighboring blocks as described above.

In still another embodiment, the context of coding the flag for the first direction depends on the transform type of the second direction. For example, if the determined transform type of the second direction is Type A, then a first context set is used for coding the flag for the first direction. Otherwise, if the determined transform type of the second direction is Type B, then a second context set is used for coding the flag for the first direction. The context set may include only one context or multiple contexts. If multiple contexts are used, the index can be determined by the transform size or the transform types of spatial neighboring blocks as described above.

In yet another embodiment, the flags are coded after coding the transform coefficients. If the number of non-zero coefficients is less than a threshold, then the flags are not coded and are inferred to be zero. In other words, the transform type is inferred to be a predefined one, such as Type A. The threshold can be 2, 3 or other integers.

In yet another embodiment, the flags are coded after coding the transform coefficients. If the number of non-zero AC coefficients is less than a threshold, then the flags are not coded and are inferred to be zero. In other words, the transform type is inferred to be a predefined one, such as Type A. The AC coefficients refer to the coefficients that are not in the top-left location (0,0) of a transform block. The threshold can be 2, 3 or other integers.

Joint Coding of the Transform Decision in Both Directions

Another method to coding the transform decision flags is joint coding of the decision in both directions. A transform index TrIdx=0, 1, 2, 3 is used to indicate the selected transform types in both directions. An embodiment of the binarization of TrIdx and mapping of TrIdx to different transform types are shown in Table 4. The CABAC can be used to code the bins after binarization.

TABLE 4

Binarization of TrIdx and mapping of TrIdx to different transform types

| TrIdx | Binarization | Transform type in horizontal direction | Transform type in vertical direction |
| --- | --- | --- | --- |
| 0 | 1 | Type A | Type A |
| 1 | 01 | Type B | Type B |
| 2 | 001 | Type A | Type B |
| 3 | 000 | Type B | Type A |

I. Context Modeling for the First Bin of the Binarization:

One context, two contexts or N (N>2) contexts can be used to code the first bin.

The context index can be determined according to the block size. For example, if the block width is CurrW and block height is CurrH, the context index is ctxIdx=(2*log 2(MaxTrSize)− log 2(CurrW)− log 2(CurrH))>>1. If ctxIdx is larger than (N−1), then ctxIdx is set to (N−1).

In still another embodiment, two context sets are used to code the first bin. The first set is used for the Intra prediction mode and the other set is used for the Inter prediction mode. The index in each set is determined by the block size as described above.

II. Context Modeling for the Second Bin:

In one embodiment, only one context is used to code the second bin. In another embodiment, two contexts are used to code the second bin, where one is used for the Intra prediction mode and the other is used for the Inter prediction mode.

III. Context Modeling for the Third Bin:

In one embodiment, only one context is used to code the third bin. In another embodiment, two contexts are used to coding the third bin: one is used for the Intra prediction mode and the other is used for the Inter prediction mode.

Note that the above described joint coding method can also be applied to code the transform index in the JEM AMT method.

In another method, Type A is DCT-II and Type B is one chosen from {DST-VII, DST-IV, DCT-IV}, and the flipped Type B is also used. Let $\hat{f}_B[k]$ be the N-point transform of the signal f[n] with transform Type B, and then flipped Type B transform can be calculated as $\hat{f}_{FB}[k]=\hat{f}_B[N-1-k]$.

In one embodiment, Intra and Inter prediction coding use different transform sets. For Intra prediction coding, the transform set in Table 4 is used. For Inter prediction coding, the transform set in Table 5 is used.

In another embodiment, both Intra and Inter prediction use the same transform set in Table 5.

TABLE 5

Binarization of TrIdx and mapping of TrIdx to different transform types

| TrIdx | Binarization | Transform type in horizontal direction | Transform type in vertical direction |
| --- | --- | --- | --- |
| 0 | 1 | Type A | Type A |
| 1 | 000 | Type B | Type B |
| 2 | 001 | Type B | Flipped Type B |
| 3 | 010 | Flipped Type B | Type B |
| 4 | 011 | Flipped Type B | Flipped Type B |

The transforms described above can be implemented using only integers with a predefined accuracy. For example, a transform coefficient can be scaled by 64 and then rounded to a nearest integer.

Figure 2:
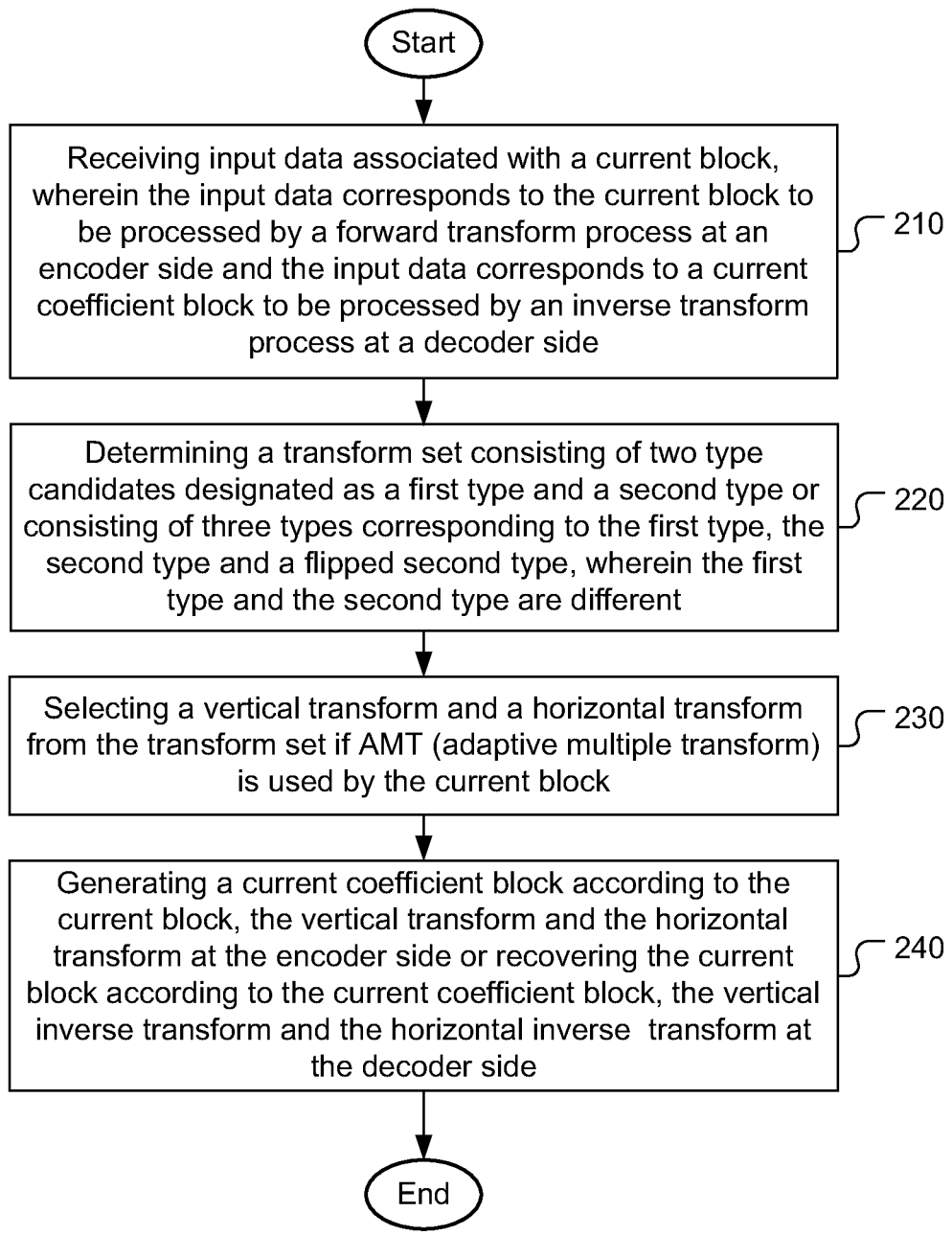
FIG. 2 illustrates a flowchart for an exemplary coding system incorporating AMT (Advanced Multiple Transform) according to a method of the present invention, where a reduced transform set is used for AMT.

FIG. 2 illustrates a flowchart for an exemplary coding system incorporating AMT (Advanced Multiple Transform) according to a method of the present invention, where a reduced transform set is used for AMT. The steps shown in the flowchart may also be implemented based on hardware such as one or more electronic devices or processors arranged to perform the steps in the flowchart. According to this method, input data associated with a current image are received in step 210, wherein the input data corresponds to the current block to be processed by a forward transform process at an encoder side and the input data corresponds to a current coefficient block to be processed by an inverse transform process at a decoder side. For example, the input data may correspond to a block of prediction residues to be processed by forward transform to obtain a transform block at the encoder side, or the input data may correspond to a transform block associated with prediction residues and the transform block to be inverse transform to recover the block of prediction residue. A transform set consisting of two type candidates designated as a first type and a second type or consisting of three types corresponding to the first type, the second type and a flipped second type is determined in step 220, where the first type and the second type are different. As mentioned previously, restricting to only two transform types can reduce the complexity of AMT process and reduce the overhead information for indicating the transform type selection. If AMT (adaptive multiple transform) is used by the current block, a vertical transform and a horizontal transform are selected from the transform set in step 230. As is known in the field of video coding, an encoder may make the selection based on a performance criterion, such as Rate-Distortion Optimization (RDO) process. At the decoder side, the selected vertical transform and horizontal transform may be determined from the coded data in the bitstream or may be determined implicitly. A current coefficient block is generated according to the current block, the vertical transform and the horizontal transform at the encoder side or the current block is recovered according to the current coefficient block, the vertical inverse transform and the horizontal inverse transform at the decoder side in step 240.

Figure 3:
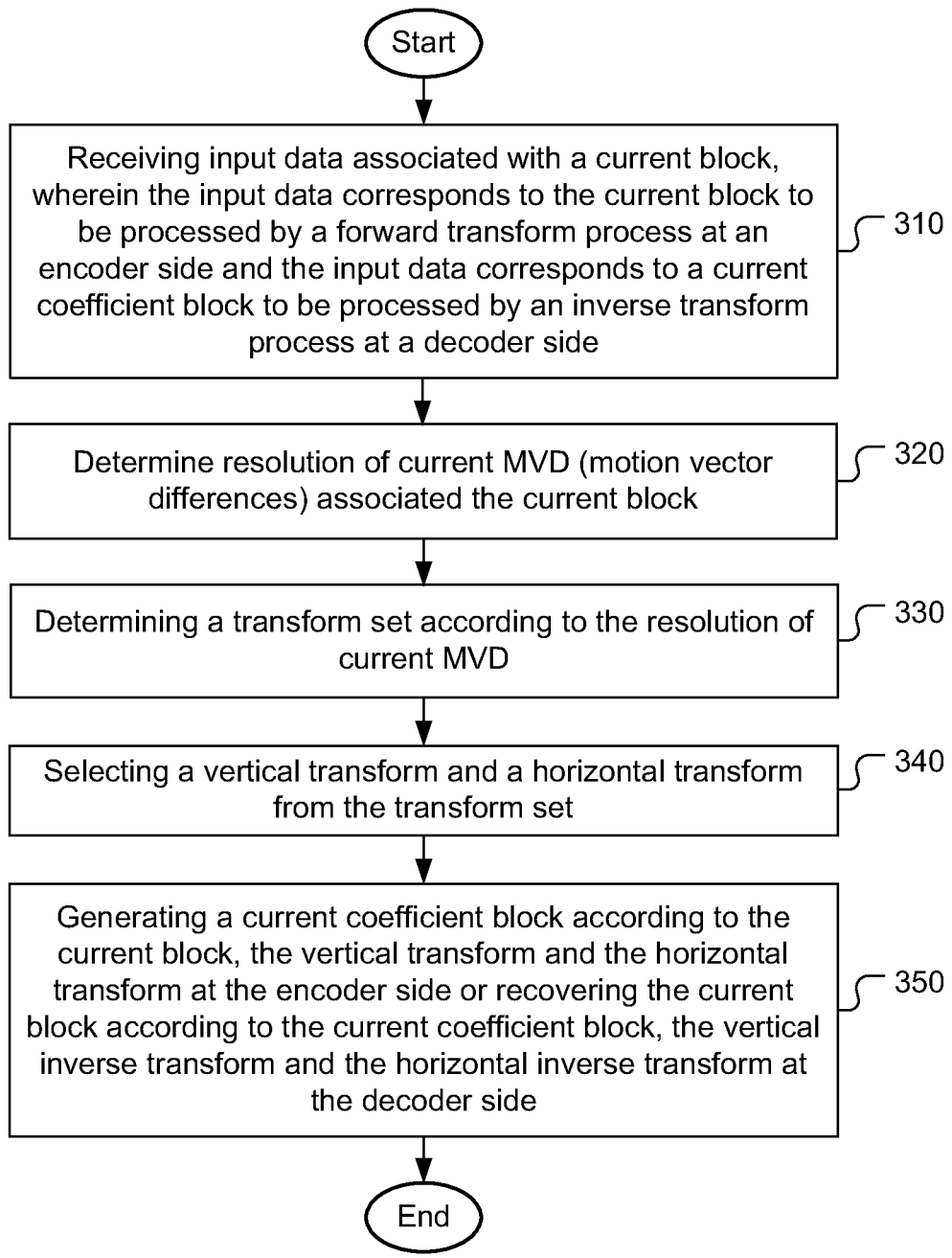
FIG. 3 illustrates a flowchart for an exemplary coding system incorporating AMT (Advanced Multiple Transform) according to a method of the present invention, where the AMT is adaptively applied according to the MVD (Motion Vector Difference) resolution.

FIG. 3 illustrates a flowchart for an exemplary coding system incorporating AMT (Advanced Multiple Transform) according to a method of the present invention, where the AMT is adaptively applied according to the MVD (Motion Vector Difference) resolution. According to this method, input data associated with a current image are received in step 310, wherein the input data corresponds to the current block to be processed by a forward transform process at an encoder side and the input data corresponds to a current coefficient block to be processed by an inverse transform process at a decoder side. For example, the input data may correspond to a block of prediction residues to be processed by forward transform to obtain a transform block at the encoder side, or the input data may correspond to a transform block associated with prediction residues and the transform block to be inverse transform to recover the block of prediction residue. Resolution of the current MVD (motion vector differences) associated the current block is determined in step 320. As is known in the field of video coding, the selection of MVD resolution can be indicated in a high level syntax. Since the finer MVD resolution will require more computations (e.g. interpolation) and more memory access, a coding system may select the MVD resolution based on system resources or coding performance. A transform set is then determined according to the resolution of current MVD in step 330. Various examples of determining the transform set based on the MVD resolution have been illustrated in disclosure. A vertical transform and a horizontal transform are selected from the transform set in step 340. As is known in the field of video coding, an encoder may make the selection based on a performance criterion, such as Rate-Distortion Optimization (RDO) process. At the decoder side, the selected vertical transform and horizontal transform may be determined from the coded data in the bitstream or may be determined implicitly. A current coefficient block is generated according to the current block, the vertical transform and the horizontal transform at the encoder side or the current block is recovered according to the current coefficient block, the vertical inverse transform and the horizontal inverse transform at the decoder side in step 350.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics.

The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for encoding or decoding video data, the method comprising:

receiving input data associated with a current block, wherein the input data corresponds to the current block to be processed by a forward transform process at an encoder side and the input data corresponds to a current coefficient block to be processed by an inverse transform process at a decoder side;

determining a single transform set consisting of two transform type candidates designated as a first transform candidate type and a second transform candidate type or consisting of three transform candidates types corresponding to the first transform candidate type, the second transform candidate type and a flipped second transform candidate type, wherein the first transform candidate type and the second transform candidate type are different; and selecting a vertical transform and a horizontal transform from the single transform set if AMT (adaptive multiple transform) is used by the current block; and generating a current coefficient block according to the current block, the vertical transform and the horizontal transform at the encoder side or recovering the current block according to the current coefficient block, a vertical inverse transform associated with the vertical transform and a horizontal inverse transform associated with the horizontal transform at the decoder side, wherein when AMT is used by the current block, the first transform candidate is available for the current block if a size of the current block ranges between a minimum size and a maximum size, and the second transform candidate is available for the current block if the size of the current block ranges between the minimum size and a half of the maximum size.

2. The method of claim 1, wherein the first transform candidate corresponds to DCT-II (Discrete Cosine Transform Type II) and the second transform candidate is selected from a group comprising DST-IV (Discrete Sine Transform Type IV), DST-VII (Discrete Sine Transform Type VII) and flipped DCT-IV (FDCT-IV, Flipped Discrete Cosine Transform Type IV).

3. The method of claim 2, wherein, if AMT is not used by the current block, the first transform candidate is selected for both the vertical transform and the horizontal transform.

4. The method of claim 2, wherein, if AMT is used by the current block, the vertical transform and the horizontal transform select different transform candidates or both the vertical transform and the horizontal transform select the second transform candidate.

5. The method of claim 1, wherein the size related to of the current block corresponds to transform block size.

6. The method of claim 1, wherein the size of the current block corresponds to transform width or transform height.

7. The method of claim 6, wherein the minimum size corresponds to a minimum transform width and a minimum transform height, and the maximum size corresponds to a maximum transform width and a maximum transform height.

8. An apparatus for encoding or decoding video data, the apparatus comprising one or more electronic circuits or processors arranged to:

receive input data associated with a current block, wherein the input data corresponds to the current block to be processed by a forward transform process at an encoder side and the input data corresponds to a current coefficient block to be processed by an inverse transform process at a decoder side;

determine a single transform set consisting of two transform type candidates designated as a first transform candidate type and a second transform candidate type or consisting of three transform candidates types corresponding to the first transform candidate type, the second transform candidate type and a flipped second transform candidate type, wherein the first transform candidate type and the second transform candidate type are different; and select a vertical transform and a horizontal transform from the single transform set if AMT (adaptive multiple transform) is used by the current block; and generate a current coefficient block according to the current block, the vertical transform and the horizontal transform at the encoder side or recovering the current block according to the current coefficient block, a vertical inverse transform associated with the vertical transform and a horizontal inverse transform associated with the horizontal transform at the decoder side, wherein when AMT is used by the current block, the first transform candidate is available for the current block if a size of the current block ranges between a minimum size and a maximum size, and the second transform candidate is available for the current block if the size of the current block ranges between the minimum size and a half of the maximum size.

* * * * *